United States Patent

Glaser et al.

[11] Patent Number: 5,883,626
[45] Date of Patent: Mar. 16, 1999

[54] DOCKING AND FLOATING MENU/TOOL BAR

[75] Inventors: Howard Justin Glaser, San Jose, Calif.; Karl David Johnson; Stewart E. Nickolas, both of Round Rock, Tex.

[73] Assignee: International Business Machines Corporation, Armonk, N.Y.

[21] Appl. No.: 828,477

[22] Filed: Mar. 31, 1997

[51] Int. Cl.[6] .................................................. G06F 3/14
[52] U.S. Cl. ............................................ 345/342; 345/340
[58] Field of Search ..................................... 345/342, 352, 345/353, 359, 354, 355, 356, 326, 379, 340, 343, 358, 337, 327–336; 707/4

[56] References Cited

U.S. PATENT DOCUMENTS

| | | | |
|---|---|---|---|
| 5,487,141 | 1/1996 | Cain et al. | 345/133 |
| 5,613,122 | 3/1997 | Burnard et al. | 395/701 |
| 5,644,737 | 7/1997 | Tuniman et al. | 345/352 |
| 5,644,739 | 7/1997 | Mounsund | 345/354 |
| 5,651,108 | 7/1997 | Cain et al. | 345/340 |

*Primary Examiner*—Raymond J. Bayerl
*Assistant Examiner*—Steven P. Sax
*Attorney, Agent, or Firm*—Merchant, Gould, Smith, Edell, Welter, & Schmidt

[57] ABSTRACT

A method, apparatus, and article of manufacture for providing a selectively docking and floating menu/tool bar for windows displayed on a monitor connected to a computer. The docking or floating nature of the menu/tool bar is selectable by the user, generally by selecting either a docking mode or floating mode from a menu displayed on the monitor. When floating mode is selected, the menu/tool bar automatically floats apart from the window. When docking mode is selected, the menu/tool bar automatically docks adjacent to the window. In floating mode, the selection of a window as an "active" window results in the activation of the menu/tool bar. In docking mode, the selection of a window as an "active" window results in the activation and immediate docking of the menu/tool bar to that window. Thereafter, any manipulation of the active window results in an identical manipulation of the docking menu/tool bar.

21 Claims, 10 Drawing Sheets

DOCKING AND FLOATING MENU/TOOL BAR

CROSS-REFERENCE TO RELATED APPLICATIONS

This application is related to the following co-pending and commonly-assigned patent applications:

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on Mar. 31, 1997, by Daniel E. House, Brian J. Owings, and Shiau-Shiau Pei, attorney's docket number ST997027;

Application Ser. No. 08/828,476, entitled "SHARED OBJECT MODEL," filed on Mar. 31, 1997, by Brian J. Owings, Shiau-Shiau Pei, and Daniel E. House, attorney's docket number ST997035;

Application Ser. No. 08/828,480, entitled "REMOTE SCRIPTING OF LOCAL OBJECTS," filed on Mar. 31, 1997, by Daniel E. House, Constance J. Nelin, and Rebecca B. Nin, attorney's docket number ST997020;

Application Ser. No. 08/828,989, entitled "METHOD AND APPARATUS FOR SIMULATING A MULTI-TIERED COMPUTER ENVIRONMENT," filed on Mar. 31, 1997, by Daniel E. House and Constance J. Nelin, attorney's docket number ST997021;

Application Ser. No. 08/828,478, entitled "MULTI-TIER VIEW PROJECT WINDOW," filed on Mar. 31, 1997, by Howard J. Glaser, Daniel E. House, and Constance J. Nelin, attorney's docket number ST997022;

Application Ser. No. 08/828,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot, attorney's docket number ST997013;

Application Ser. No. 08/828,846, entitled "SHARED MODULES GRAPHICAL USER INTERFACE," filed on Mar. 31, 1997, by Howard J. Glaser, Daniel E. House, and Constance J. Nelin, attorney's docket number ST997025;

Application Ser. No. 08/828,479, entitled "QUERY SELECTION FOR A PROGRAM DEVELOPMENT ENVIRONMENT," filed on Mar. 31, 1997, by Howard J. Glaser and Mary C. Lehner, attorney's docket number ST997040;

Application Ser. No. 08/828,890, entitled "HTML INTEGRATION UTILITY FOR A PROGRAM DEVELOPMENT ENVIRONMENT," filed on Mar. 31, 1997, by Howard J. Glaser, attorney's docket number ST997028;

Application Ser. No. 08/828,897, entitled "EXTENDER SMART GUIDE," filed on Mar. 31, 1997, by Howard J. Glaser, attorney's docket number ST997026;

Application Ser. No. 08/828,481, entitled "MULTI-TIER DEBUGGING," filed on Mar. 31, 1997, by Daniel E. House and Constance J. Nelin, attorney's docket number ST997036; and Application Ser. No. 08/828,990, entitled "DYNAMIC DISCOVERY OF CONTROLS," filed on Mar. 31, 1997, by Daniel E. House and Constance J. Nelin, attorney's docket number ST997037;

all of which applications are incorporated by reference herein.

BACKGROUND OF THE INVENTION

1. Field of the Invention

This invention relates in general to programming development environments performed by computers, and in particular, to the use of a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a selectively docking and floating menu/tool bar for windows displayed on a monitor connected to a computer. The docking or floating nature of the menu/tool bar is selectable by the user, generally by selecting either a docking mode or floating mode from a menu displayed on the monitor. When floating mode is selected, the menu/tool bar automatically floats apart from the window. When docking mode is selected, the menu/tool bar automatically docks adjacent to the window.

In floating mode, the selection of a window as an "active" window results in the activation of the menu/tool bar. When activated, the menu/tool bar comes to the "top" (if hidden under other windows) along with the activated window.

In docking mode, the selection of a window as an "active" window results in the activation and immediate docking of the menu/tool bar to that window. Thereafter, any manipulation of the active window results in an identical manipulation of the docking menu/tool bar in docking mode. For example, the menu/tool bar is re-sized when the window is re-sized, the menu/tool bar is moved when the window is moved, the menu/tool bar is maximized when the window is maximized, the menu/tool bar is minimized when the window is minimized, etc.

In both floating and docking mode, the menu/tool bar takes its title from the active window. The title area of the menu/tool bar is updated accordingly.

BRIEF DESCRIPTION OF THE DRAWINGS

Referring now to the drawings in which like reference numbers represent corresponding parts throughout:

FIGS. 6B, 6C, 6D, and 6E are block diagrams of a computer generated display illustrating the operation of the routine of FIG. 6A, wherein FIG. 6B illustrates the form editor docked to the form window for FORM1, FIG. 6C illustrates the form editor docked to the form window for FORM2, FIG. 6D illustrates the form editor floating and not being docked to either form window, and FIG. 6E illustrates a pop-up menu for the form editor that allows for selecting either docking or floating mode.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
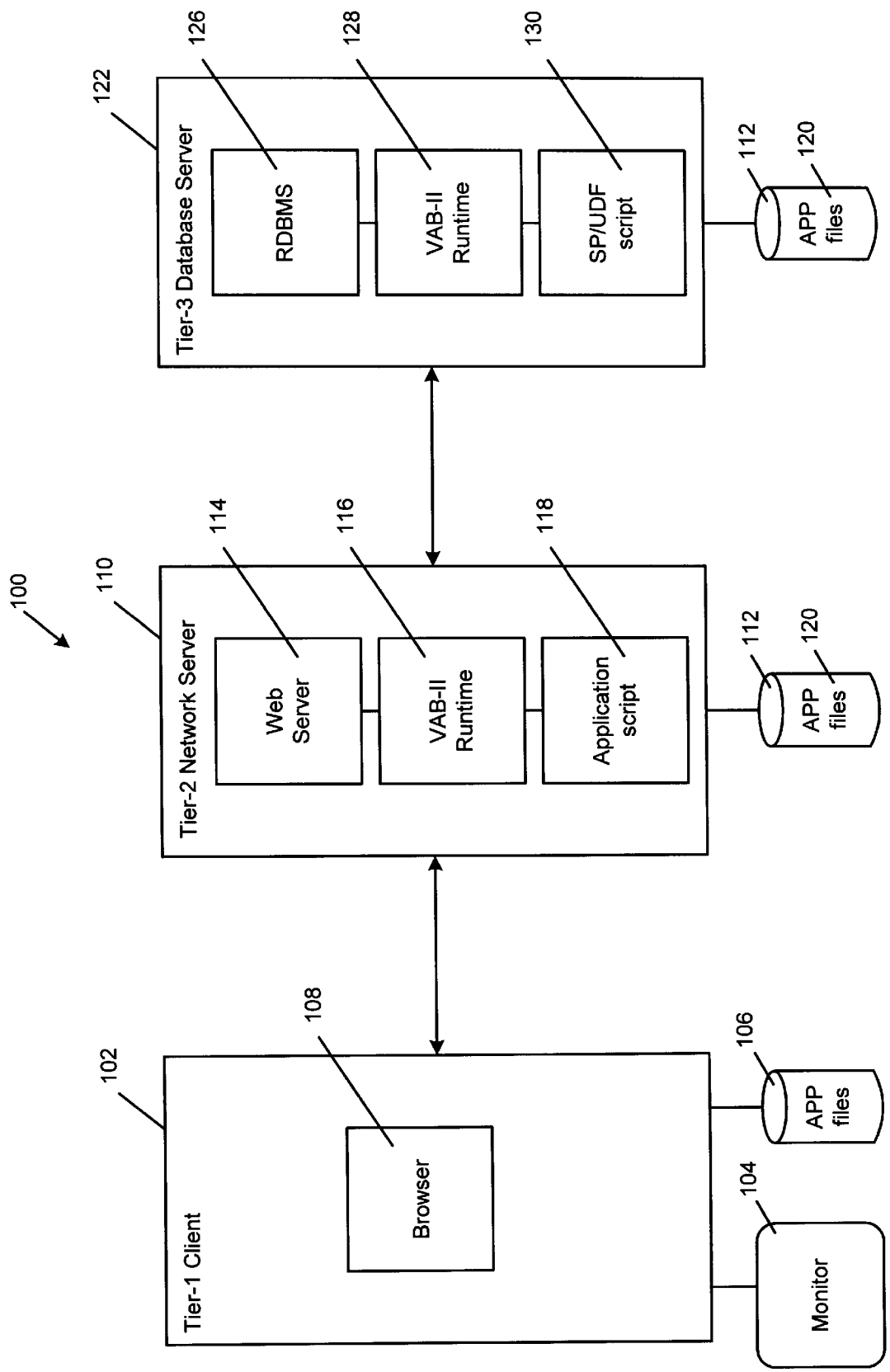
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
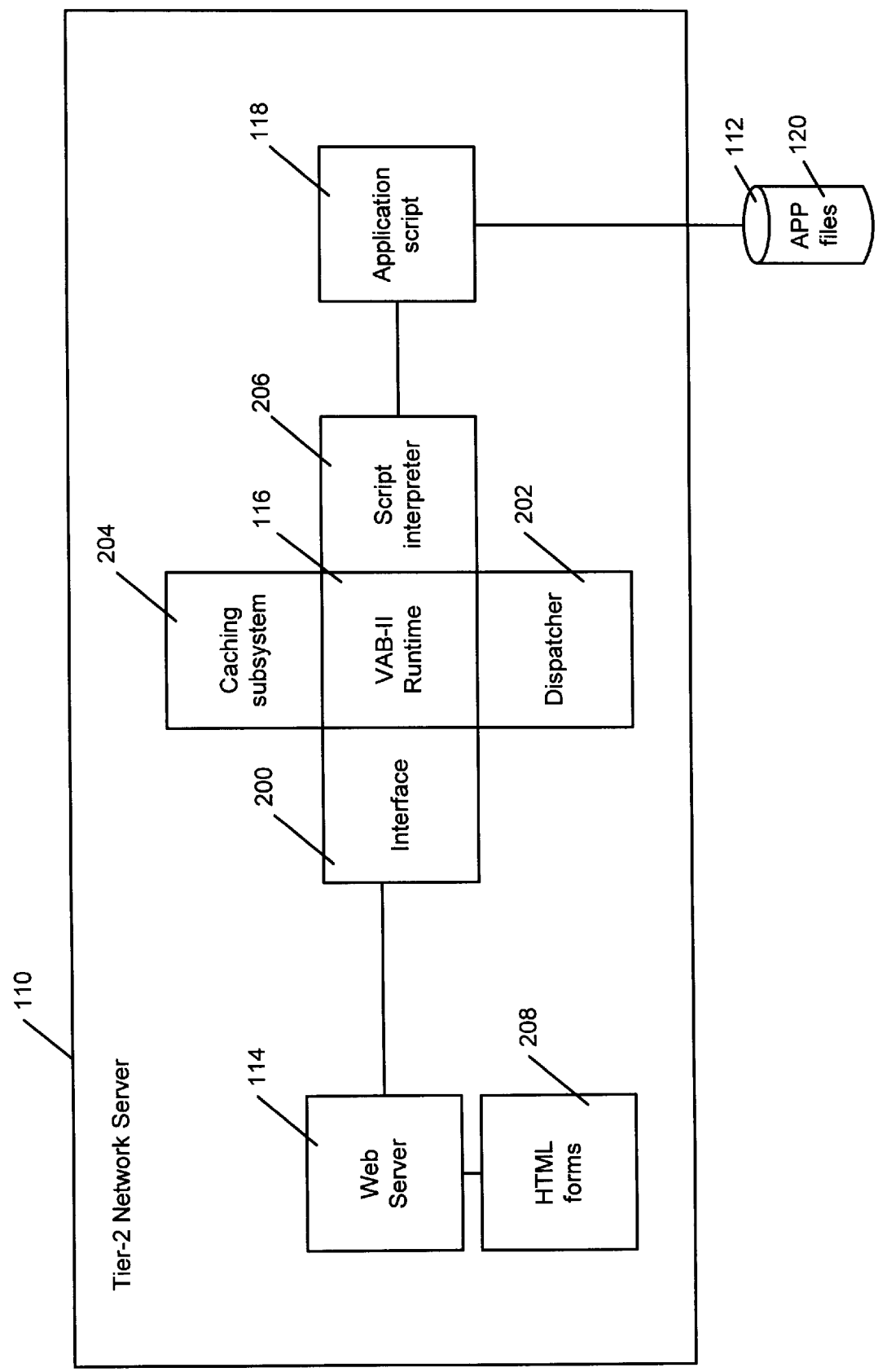
FIG. 2 is a block diagram that further illustrates the components of the network server in the present invention.

FIG. 2 is a block diagram that further illustrates the components of the network server 110 in the present invention. The VAR-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
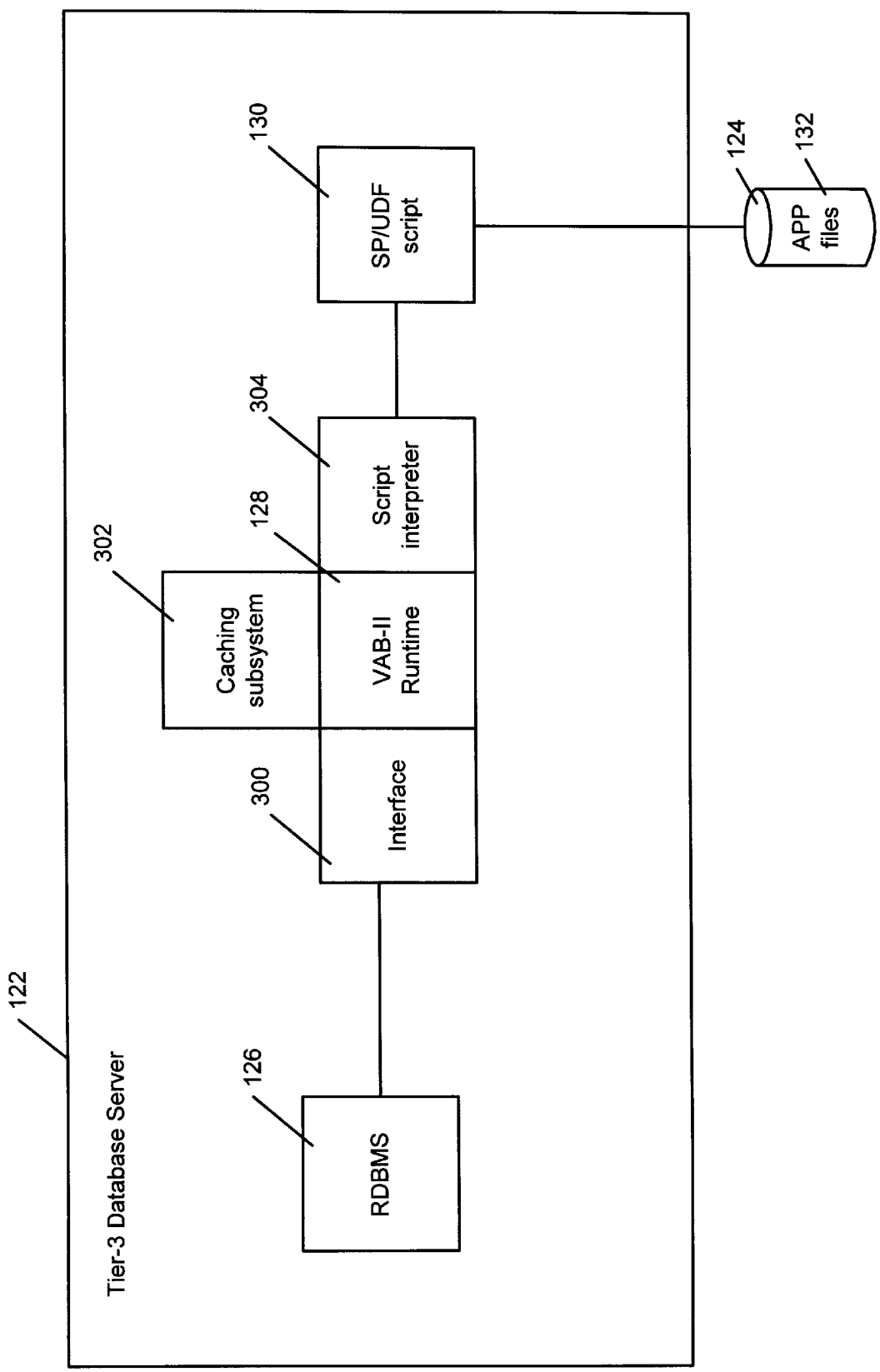
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDEMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
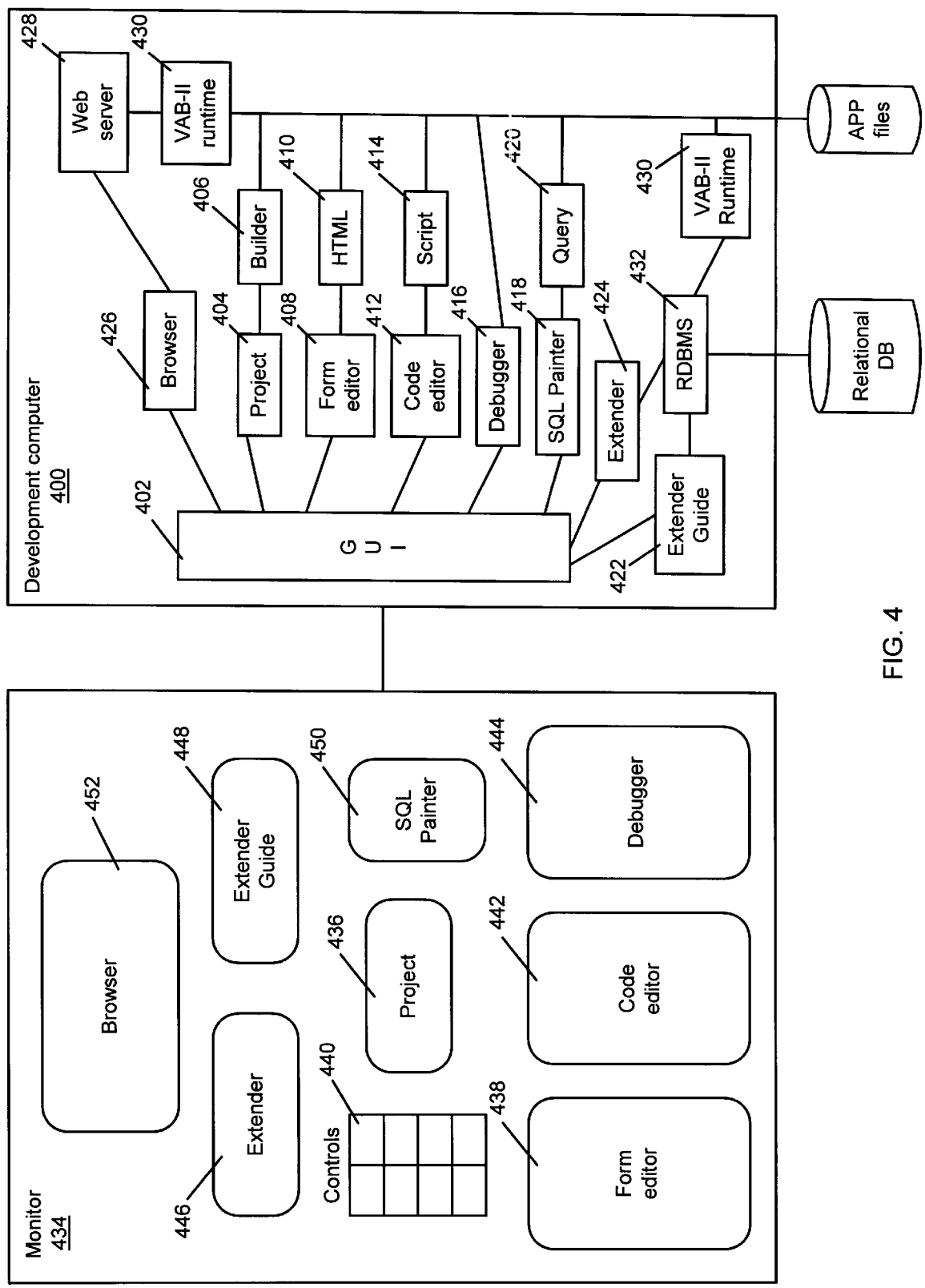
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Docking and Floating Form Editor

The present invention provides a selectively docking and floating menu/tool bar for windows displayed on the monitor 434 connected to the development computer 400. In the preferred embodiment, the menu/tool bar is an editor menu/tool bar that includes selectable editing functions, although those skilled in the art will recognize that it has application to any type of menu/tool bar having any type of selectable functions.

The docking or floating nature of the menu/tool bar is selectable by the user, generally by selecting either a docking mode or floating mode from a menu displayed on the monitor. When floating mode is selected, the menu/tool bar automatically floats apart from the window. When docking mode is selected, the menu/tool bar automatically docks adjacent to the window.

In floating mode, the selection of a window as an "active" window results in the activation of the menu/tool bar. When activated, the menu/tool bar comes to the "top" (if hidden under other windows) along with the activated window.

In docking mode, the selection of a window as an "active" window results in the activation and immediate docking of the menu/tool bar to that window. Thereafter, any manipulation of the active window results in an identical manipulation of the docking menu/tool bar in docking mode. For example, the menu/tool bar is re-sized when the window is re-sized, the menu/tool bar is moved when the window is moved, the menu/tool bar is maximized when the window is maximized, the menu/tool bar is minimized when the window is minimized, etc.

In both floating and docking mode, the menu/tool bar takes its title from the active window. The title area of the menu/tool bar is updated accordingly.

Figure 5:
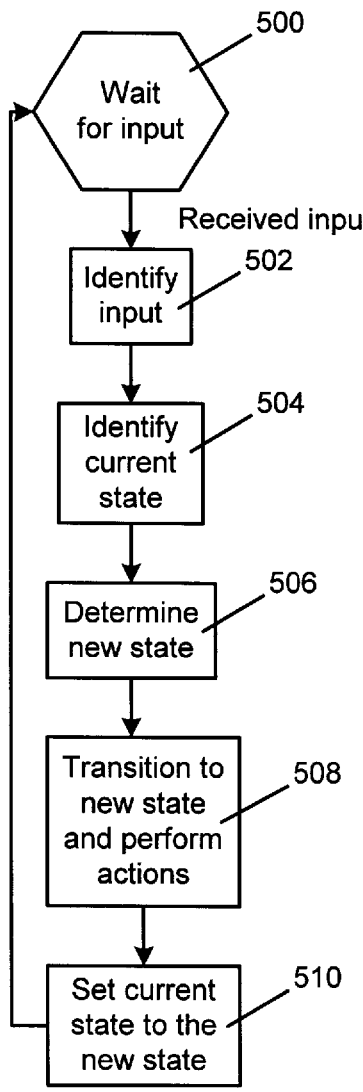
FIG. 5 is a flow chart that illustrates the general logic of the development computer in performing the steps of the present invention, and more specifically, in performing the steps necessary for handling the user interface for the development computer.

FIG. 5 is a flow chart that illustrates the general logic of the development computer 400 in performing the steps of the present invention, and more specifically, in performing the steps necessary for handling the user interface for the development computer 400. In the development computer 400, operations are performed when transitions are made, based upon input events, from present or current states to new states.

Block 500 represents the development computer 400 waiting for an input event (e.g., a mouse button click). It should be appreciated that during this time, other system tasks, e.g., file, memory, and video tasks, etc., may also be carried out. When an input event occurs, control passes to block 502 to identify the input event. Based upon the input event, as well as the current state of the development computer 400 determined in block 504, a new state is determined in block 506. In block 508, a transition is made to the new state and performs any actions required for the transition. In block 510, the current state is set to the previously determined new state, and control returns to block 500 to wait for more input events.

The specific operations that are performed by block 508 when transitioning between states will vary depending upon the current state and the input event. The various operations required to implement the present invention represent particular events handled by the development computer. However, it should be appreciated that these events represent merely a subset of all of the events handled by the development computer 400.

Figure 6A:
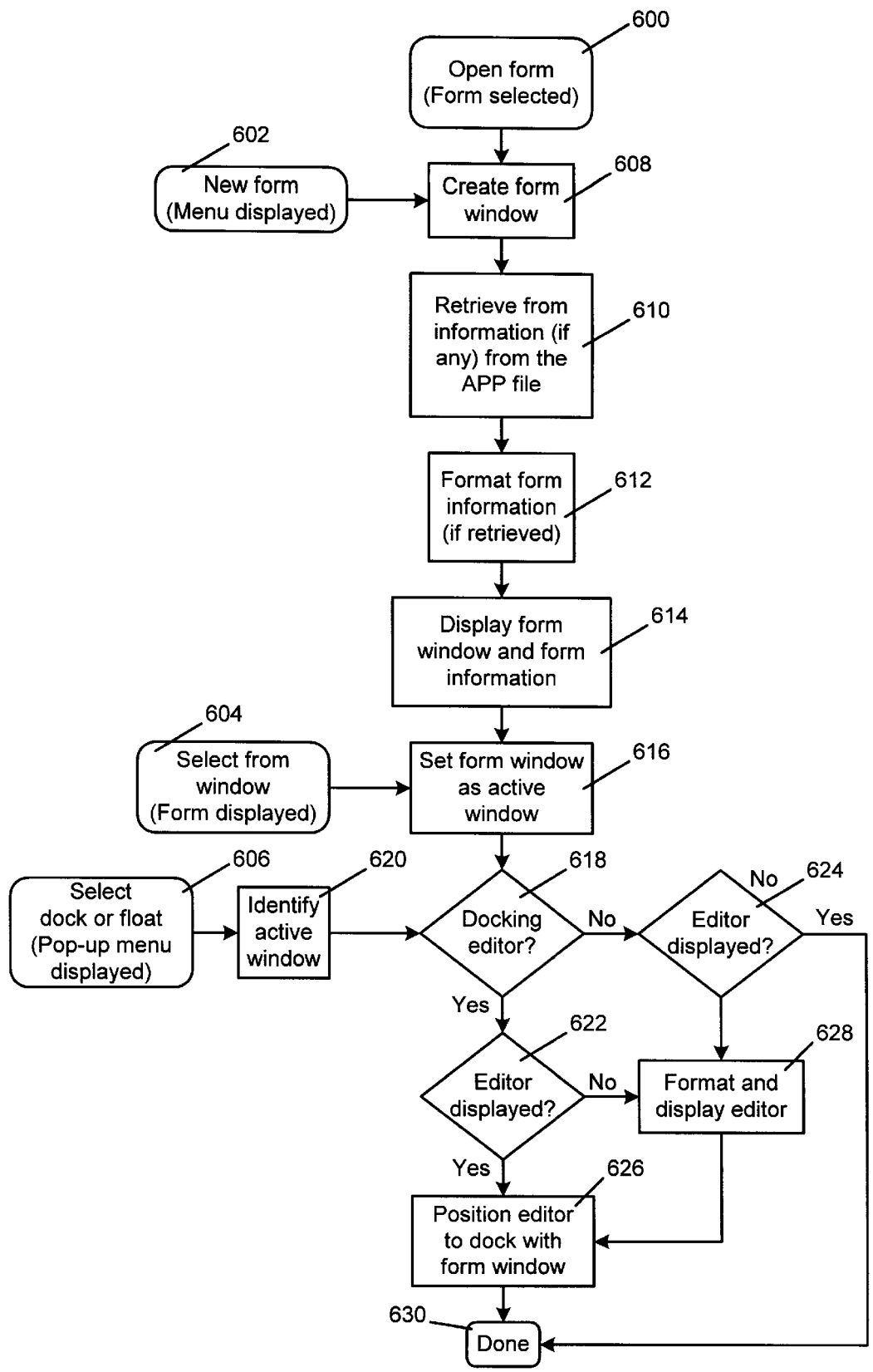
FIG. 6A is a flow chart that illustrates the general logic that implements the "open form (form selected)", "new form (menu displayed)", "select form window (form displayed)", and "select dock or float (pop-up menu displayed)" functions.
Figure 6B:
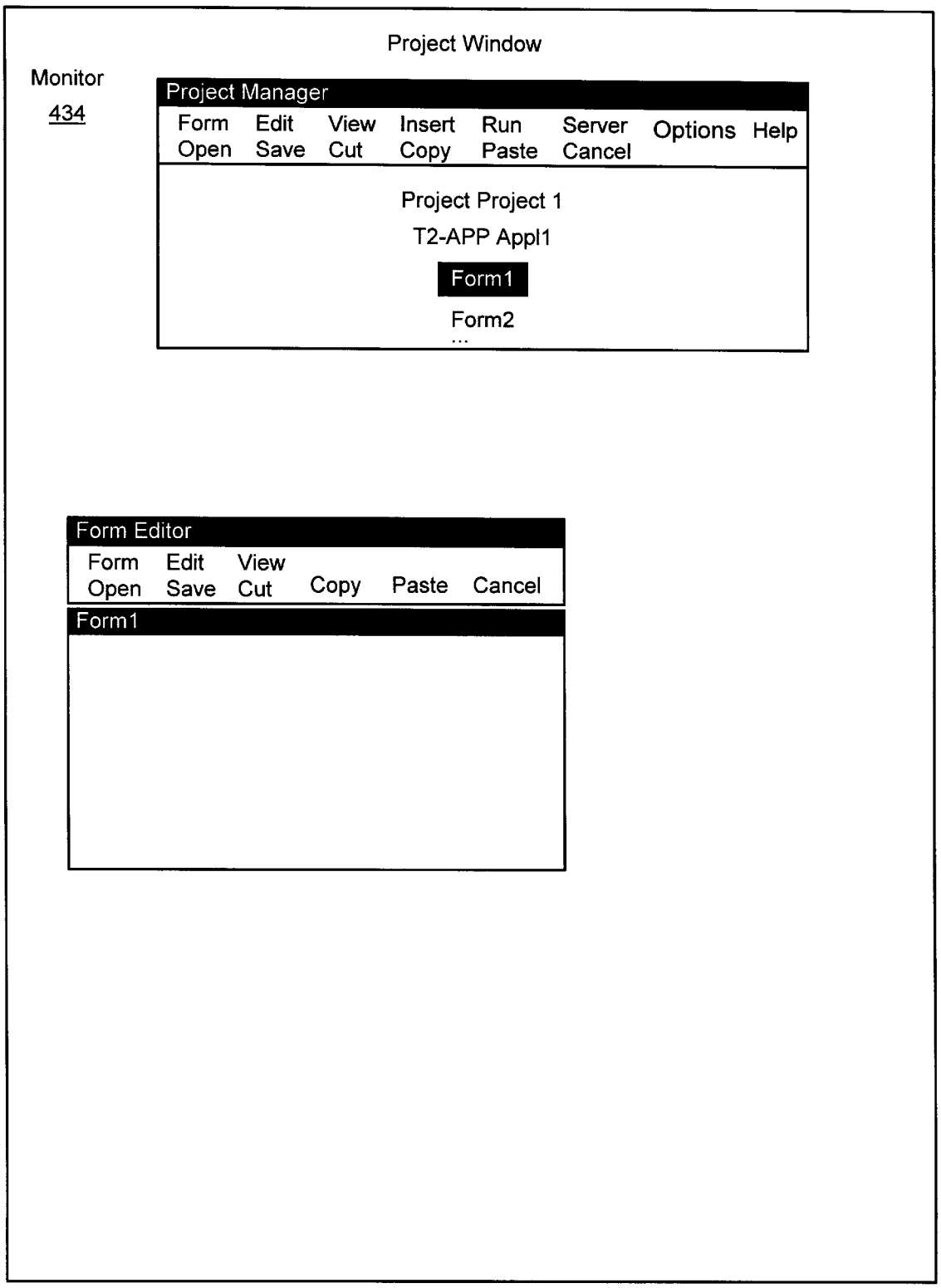
Figure 6C:
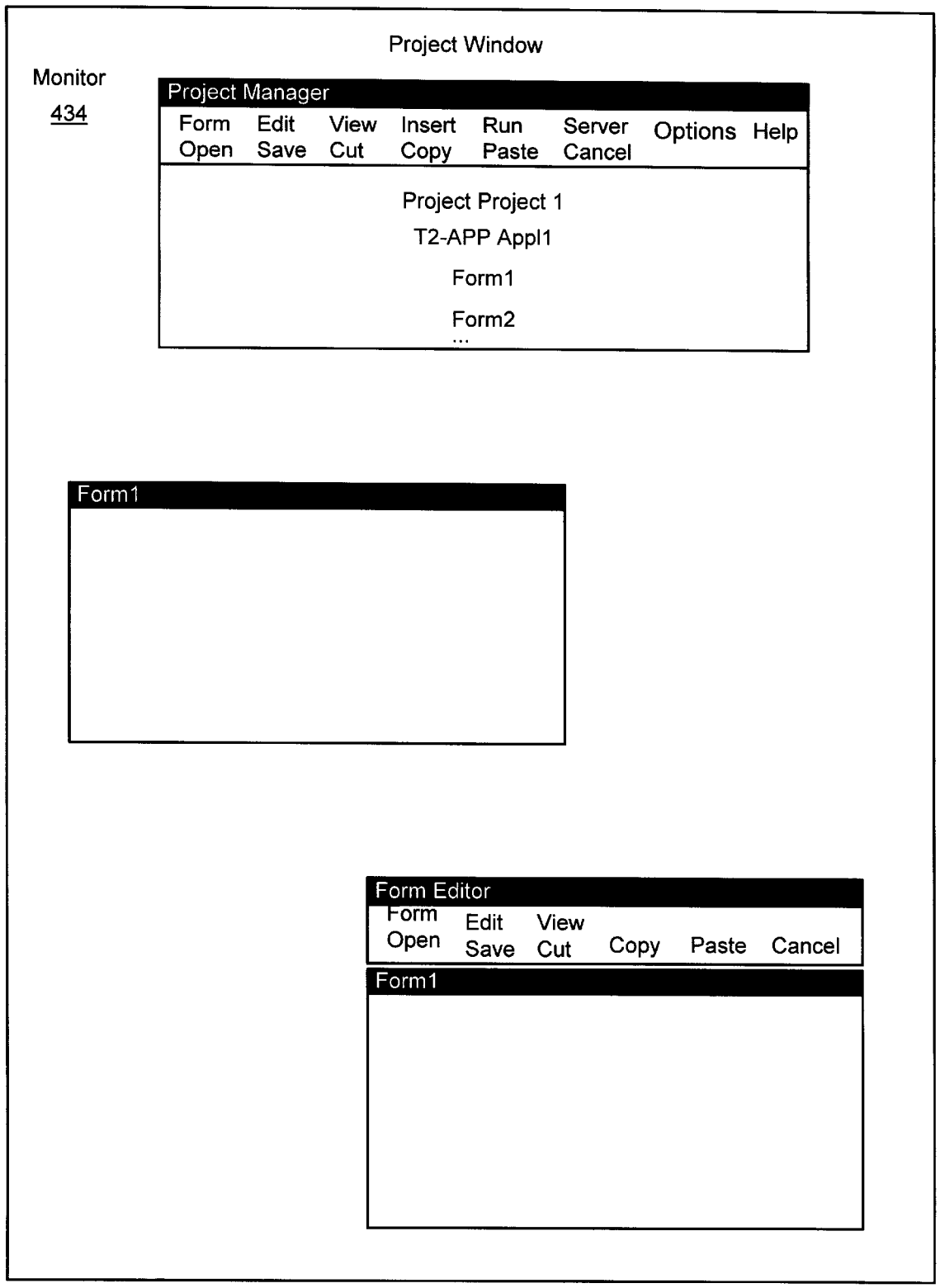
Figure 6D:
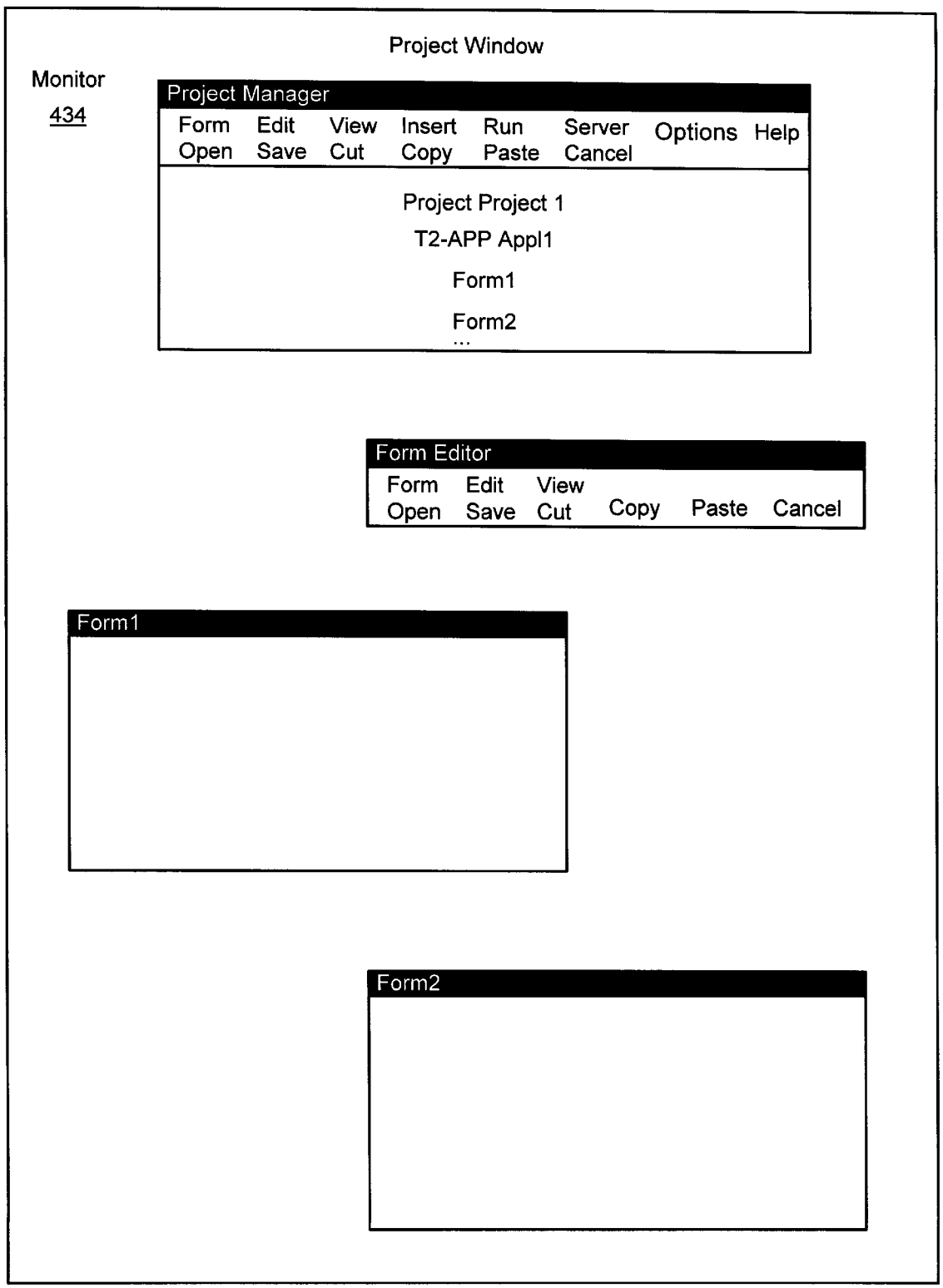
Figure 6E:
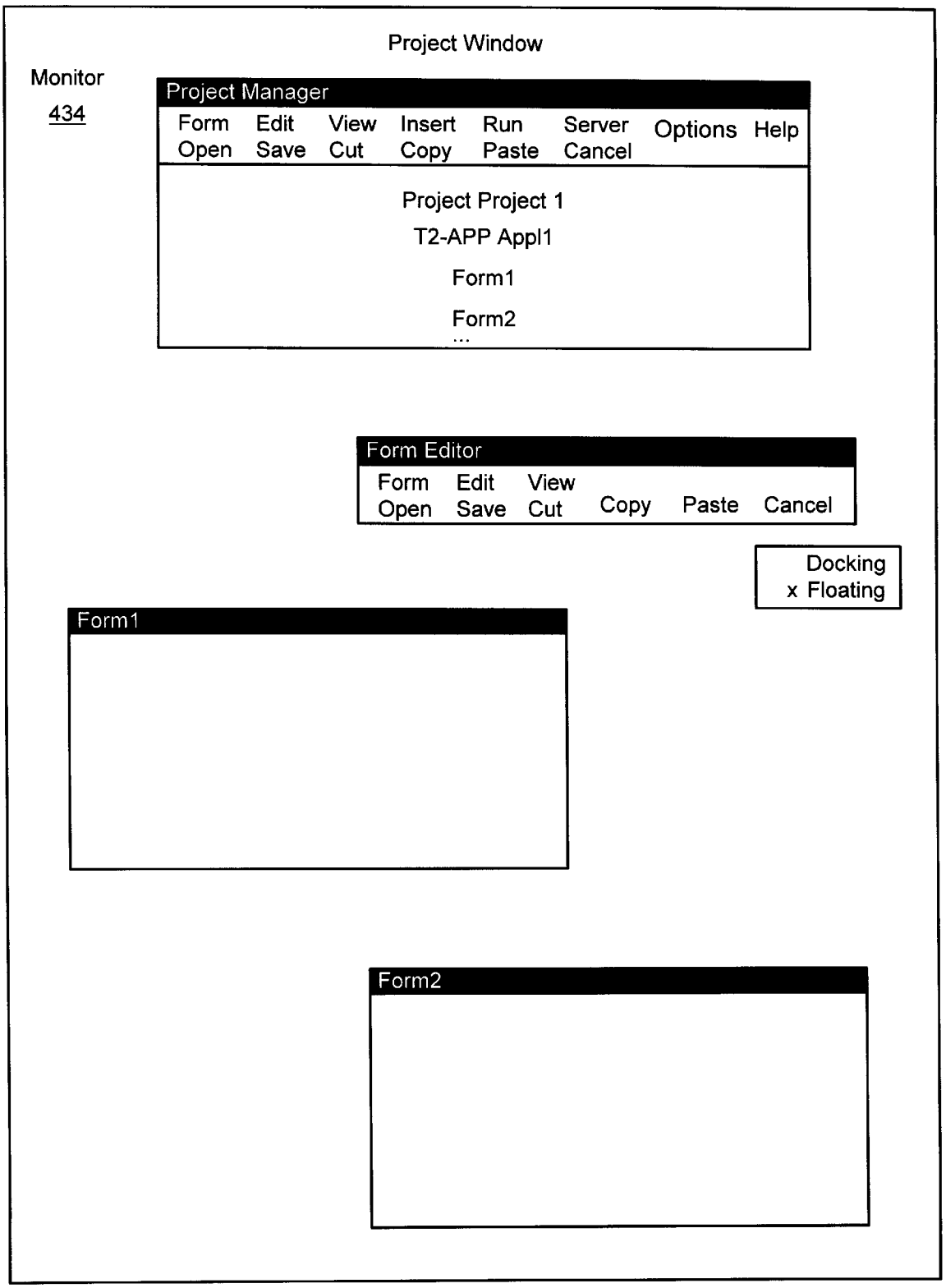

FIG. 6A is a flow chart that illustrates the general logic that implements the docking and floating menu/tool bar according to the present invention. In this example, the menu/tool bar is a form editor for use with form windows, and FIG. 6A illustrates the logic performed for "open form (form selected)", "new form (menu displayed)", "select form window (form displayed)", and "select dock or float (pop-up menu displayed)" events in the development computer 400. FIGS. 6B, 6C, 6D, and 6E are block diagrams of a computer-generated display illustrating the operation of the routine of FIG. 6A, wherein FIG. 6B illustrates the form editor docked to the form window for FORM1, FIG. 6C illustrates the form editor docked to the form window for FORM2, FIG. 6D illustrates the form editor floating and not being docked to either form window, and FIG. 6E illustrates a pop-up menu for the form editor that allows for selecting either docking or floating mode.

In the preferred embodiment, the logic is executed whenever an "open form (form selected)" 600, "new form (menu displayed)" 602, "select form window (form displayed)" 604, or "select dock or float (pop-up menu displayed)" 606 event occurs in the development computer 400. The events may occur in response to various user inputs, e.g., by various mouse/keyboard combinations to invoke the function.

Following Block 600 or 602, Block 608 represents the development computer 400 creating the form window. The form window includes typical user interface mechanisms such as a title bar, a border, scroll bars, a minimize button, a tag maximize button, and a close button. A contents area is defined within the form window.

Block 610 represents the development computer 400 retrieving the form information (if any) from an APP file stored in a data storage device connected (either locally or remotely) to the development computer 400. An "open form (form selected)" event implies that form information is retrieved from the APP file, while an "new form (menu displayed)" event implies that there is no such form in the APP file, because the form is new.

Block 612 represents the development computer 400 formatting the retrieved form information (if any) for display within the contents area of the form window; otherwise, the contents area is blank.

Block 614 represents the development computer 400 displaying the form window and the formatted form information (if any) on a monitor, as shown in FIG. 6B. opening or creation of the form window is then complete.

Block 616 represents the development computer 400 setting the displayed form window as the "active" window. This block is also the entry point for the "select form window (form displayed)" 604 event.

Block 618 is a decision block that represents the development computer 400 determining whether the form editor has been set for docking. This block is also the entry point for the "select dock or float (pop-up menu displayed)" 606 event, after the active form window is identified in Block 620. If the form editor has been set for docking, then control transfers to block 622; otherwise, control transfers to block 624.

Block 622 is a decision block that represents the development computer 400 determining whether the form editor is displayed on the monitor. If so, control transfers to block 626; otherwise, control transfers to block 628.

Block 624 also is a decision block that represents the development computer determining whether the form editor is displayed on the monitor. If so, control transfers to block 626; otherwise, control transfers to block 628.

Block 628 represents the development computer 400 formatting and displaying form editor on the monitor.

Block 6262 represents the development computer 400 positioning the form editor to dock with the active form window. In FIG. 6B, the form editor docks with the form window for FORM1; in FIG. 6C, the form editor docks with the form window for FORM2. Once docked with the form window, any operations performed on the form window while it is the active window, such as moving, sizing, minimizing, or maximizing, are also performed on the form editor.

Finally, Block 630 represents the termination of the logic.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a selectively docking and floating menu/tool bar for windows displayed on a monitor connected to a computer. The docking or floating nature of the menu/tool bar is selectable by the user, generally by selecting either a docking mode or floating mode from a menu displayed on the monitor. When floating mode is selected, the menu/tool bar automatically floats apart from the window. When docking mode is selected, the menu/tool bar automatically docks adjacent to the window. In docking mode, the selection of a window as an "active" window results in the immediate docking of the menu/tool bar to that window. Thereafter, any manipulation of the active window results in an identical manipulation of the docking menu/tool bar.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of manipulating information, comprising the steps of:

(a) displaying a visual representation of the information in a window on a monitor connected to the computer;

(b) displaying a selectively docking and floating generic menu/tool bar on the monitor connected to the computer in conjunction with the display of the window, wherein the menu/tool bar includes selectable functions for manipulating the displayed visual representation of the information;

(c) when docking mode is selected, then selecting a window to be active from a plurality of windows, and automatically attaching the menu/tool bar to the said selected window; and (d) when floating mode is selected, automatically floating the menu/tool bar apart from the window.

2. The method of claim 1, further comprising the step of selecting either docking or floating mode for the menu/tool bar.

3. The method of claim 2, further comprising the steps of:
displaying a menu on the monitor connected to the computer, wherein the menu includes a docking mode selection and a floating mode selection;
selecting either the docking mode selection or floating mode selection from the displayed menu.

4. The method of claim 1, further comprising the step of manipulating the display of the menu/tool bar whenever the display of the window is manipulated.

5. The method of claim 4, wherein the manipulating step further comprising one or more steps selected from a group of steps comprising: re-sizing the menu/tool bar when the window is re-sized, moving the menu/tool bar when the window is moved, maximizing the menu/tool bar when the window is maximized, and minimizing the menu/tool bar when the window is minimized.

6. The method of claim 1, further comprising the steps of:
displaying a plurality of windows on the monitor connected to the computer;
selecting one of the windows on the monitor connected to the computer as an active window; and
docking the menu/tool bar to the selected active window.

7. The method of claim 1, further comprising the steps of:
displaying a plurality of windows on the monitor connected to the computer;
selecting one of the windows on the monitor connected to the computer as an active window; and
automatically floating the menu/tool bar apart from the selected active window.

8. The apparatus of claim 7, further comprising:
means for displaying a plurality of windows on the monitor connected to the computer;
means for selecting one of the windows on the monitor connected to the computer as an active window; and
means for automatically floating the menu/tool bar apart from the selected active window.

9. A computer-implemented apparatus for manipulating information, comprising:

(a) a computer with a monitor connected thereto;

(b) means, performed by the computer, for displaying a visual representation of the information in a window on the monitor connected to the computer;

(c) means, performed by the computer, for displaying a selectively docking an generic menu/tool bar on the monitor connected to the computer in conjunction with the display of the window, wherein the menu/tool bar includes selectable functions for manipulating the displayed visual representation of the information;

(d) when docking mode is selected, then selecting a window to be active from a plurality of windows, and automatically attaching the menu/tool bar to the said selected window; and (e) when floating mode is selected, automatically floating the menu/tool bar apart from the window.

10. The apparatus of claim 9, further comprising the means for selecting either docking or floating mode for the menu/tool bar.

11. The apparatus of claim 10, further comprising:
means for displaying a menu on the monitor connected to the computer, wherein the menu includes a docking mode selection and a floating mode selection; and
means for selecting either the docking mode selection or floating mode selection from the displayed menu.

12. The apparatus of claim 9, further comprising means for manipulating the display of the menu/tool bar whenever the display of the window is manipulated.

13. The apparatus of claim 12, wherein the manipulating means further comprises one or more means selected from a group of means comprising: means for re-sizing the menu/tool bar when the window is re-sized, means for moving the menu/tool bar when the window is moved, means for maximizing the menu/tool bar when the window is maximized, and means for minimizing the menu/tool bar when the window is minimized.

14. The apparatus of claim 9, further comprising:
means for displaying a plurality of windows on the monitor connected to the computer;
means for selecting one of the windows on the monitor connected to the computer as an active window; and
means for docking the menu/tool bar to the selected active window.

15. An article of manufacture comprising a program storage medium readable by a computer and embodying one or more instructions executable by the computer to perform method steps for manipulating information, the method comprising the steps of:

(a) displaying a visual representation of the information in a window on a monitor connected to the computer;

(b) displaying a selectively docking and floating generic menu/tool bar on the monitor connected to the computer in conjunction with the display of the window, wherein the menu/tool bar includes selectable functions for manipulating the displayed visual representation of the information;

(c) when docking mode is selected, then selecting a window to be active from a plurality of windows, and automatically attaching the menu/tool bar to the said selected window; and (d) when floating mode is selected, automatically floating the menu/tool bar apart from the window.

16. The article of manufacture of claim 15, further comprising the step of selecting either docking or floating mode for the menu/tool bar.

17. The article of manufacture of claim 16, further comprising the steps of:
displaying a menu on the monitor connected to the computer, wherein the menu includes a docking mode selection and a floating mode selection; and
selecting either the docking mode selection or floating mode selection from the displayed menu.

18. The article of manufacture of claim 15, further comprising the step of manipulating the display of the menu/tool bar whenever the display of the window is manipulated.

19. The article of manufacture of claim 18, wherein the manipulating step further comprising one or more steps selected from a group of steps comprising: re-sizing the menu/tool bar when the window is re-sized, moving the menu/tool bar when the window is moved, maximizing the menu/tool bar when the window is maximized, and minimizing the menu/tool bar when the window is minimized.

20. The article of manufacture of claim 15, further comprising the steps of:

displaying a plurality of windows on the monitor connected to the computer;

selecting one of the windows on the monitor connected to the computer as an active window; and docking the menu/tool bar to the selected active window.

21. The article of manufacture of claim 15, further comprising the steps of:

displaying a plurality of windows on the monitor connected to the computer;

selecting one of the windows on the monitor connected to the computer as an active window; and automatically floating the menu/tool bar apart from the selected active window.

\* \* \* \* \*

UNITED STATES PATENT AND TRADEMARK OFFICE
CERTIFICATE OF CORRECTION

PATENT NO. : 5,883,626
DATED : March 16, 1999
INVENTOR(S) : Howard Justin Glaser, Karl David Johnson and Stewart E. Nickolas It is certified that error appears in the above-indentified patent and that said Letters Patent is hereby corrected as shown below:

Col. 9, ln. 44, delete "7" and insert -- 9 --;
Col. 9, ln. 59, delete "an" and insert -- and floating --.

Additional U.S. References:

| | | | |
|---|---|---|---|
| 5,168,441 | 12./992 | Onarheim et al. | 364/146 |
| 5,179,698 | 1/1993 | Bachman et al. | 707/4 |
| 5,193,182 | 3/1993 | Bachman et al. | 707/4 |
| 5,193,183 | 3.1993 | Bachman et al. | 707/1 |
| 5,195,178 | 3/1993 | Krieger et al. | 345/347 |
| 5,241,645 | 8/1993 | Cimral et a. | 395/500 |
| 5,249,300 | 9/1993 | Bachman et al. | 707/104 |
| 5,651,108 | 7/1997 | Cain et al. | 395/340 |

Signed and Sealed this

Third Day of April, 2001

Attest:

NICHOLAS P. GODICI

Attesting Officer    Acting Director of the United States Patent and Trademark Office